United States Patent [19]

Bilas

[11] Patent Number: 4,797,058
[45] Date of Patent: Jan. 10, 1989

[54] AUTOMOBILE WHEEL LIFT

[76] Inventor: Michael Bilas, 2730 Columbiana-New Castle Rd., New Springfield, Ohio 44443

[21] Appl. No.: 59,029
[22] Filed: Jun. 8, 1987
[51] Int. Cl.⁴ .............................................. B60P 3/12
[52] U.S. Cl. ..................................... 414/563; 280/402
[58] Field of Search ............ 414/563; 280/402, 405 R

[56] References Cited

U.S. PATENT DOCUMENTS

| | | |
|---|---|---|
| 2,197,406 | 4/1940 | Fleming et al. ...................... 414/563 |
| 3,137,401 | 6/1964 | Curtis ................................... 414/563 |
| 3,599,811 | 8/1971 | Watkins ................................ 414/563 |
| 3,620,393 | 11/1971 | Bubik ................................... 414/563 |
| 3,716,152 | 2/1973 | Sloter ................................... 280/402 |
| 4,314,709 | 2/1982 | Silbernagel ...................... 280/405 R |
| 4,384,817 | 5/1983 | Peterson .............................. 414/563 |
| 4,473,237 | 9/1984 | Lind ..................................... 414/563 |
| 4,473,334 | 9/1984 | Brown .................................. 414/563 |
| 4,534,579 | 8/1985 | Shackelford, Sr. ................. 414/563 |
| 4,586,866 | 5/1986 | Kvamme ............................. 414/563 |
| 4,611,968 | 9/1986 | Casteel ................................ 414/563 |
| 4,637,623 | 1/1987 | Bubik .............................. 414/563 X |

FOREIGN PATENT DOCUMENTS 438044 11/1967 Switzerland .

Primary Examiner—Frank E. Werner
Attorney, Agent, or Firm—Harpman & Harpman

[57] ABSTRACT

An automobile wheel lift device for use on pick-up trucks or the like to convert the truck to a tow truck for vehicles. The wheel lift device comprises a support frame secured to the truck, a vertical disposed lift bar and outwardly extending vehicle engagement arms. A secondary wheel and axle assembly stabilizes the truck during towing.

3 Claims, 2 Drawing Sheets

AUTOMOBILE WHEEL LIFT

BACKGROUND OF THE INVENTION

1. Technical Field

This device relates to vehicle lift mechanisms that are mounted in the truck bed of a pick-up type truck that converts the truck into a tow truck for towing vehicles at reduced cost.

2. Description of Prior Art

Prior Art devices of this type have relied on a variety of different designs to convert pick-up trucks into tow trucks, see for example U.S. Pat. Nos. 3,716,152, 4,473,237, 4,473,334, 4,534,579, 4,586,866 and 3,599,811.

In U.S. Pat. No. 3,716,152 a towing means is disclosed having a pivoted bar with a hydraulic cylinder secured thereto.

U.S. Pat. No. 4,473,237 has a lift and tow bar extending from the vehicles axle.

U.S. Pat. No. 4,473,334 discloses a towing device having a pair of pivoted arms within the truck bed that is lifted by a hydraulic piston cylinder assembly.

In U.S. Pat. No. 4,534,579 a wheel lift of a tow truck is disclosed having a horizontally extended vehicle engagement arm and a vertical pivot member to which the hook from the truck's boom is secured via a cable for raising.

U.S. Pat. No. 4,586,866 discloses a towing apparatus having pivoted arms within a cable lift secured to the outer most arm engaging the vehicle.

U.S. Pat. No. 3,599,811 shows a towing apparatus with multiple arm sections which is pivoted upwardly from a single pivot point then lifted by a cable extending from the tow trucks winch or boom.

Still a further modification of a lift device can be seen in U.S. Pat. No. 3,137,401 in which a vertically positioned adjustable mast is used as a lift support by a pair of secondary wheels secured thereto. The vehicle is lifted by the cable and hook extending from a winch in the tow truck.

SUMMARY OF THE INVENTION

An automobile wheel lift device for use in converting pick-up trucks to tow trucks comprises a truck bed mountable support frame and vertically aligned lift tube with a pivoted inner-connected horizontally extensible automobile engagement arm all activated by a pair of hydraulic lift cylinders.

DESCRIPTION OF THE PREFERRED EMBODIMENT

Figure 1:
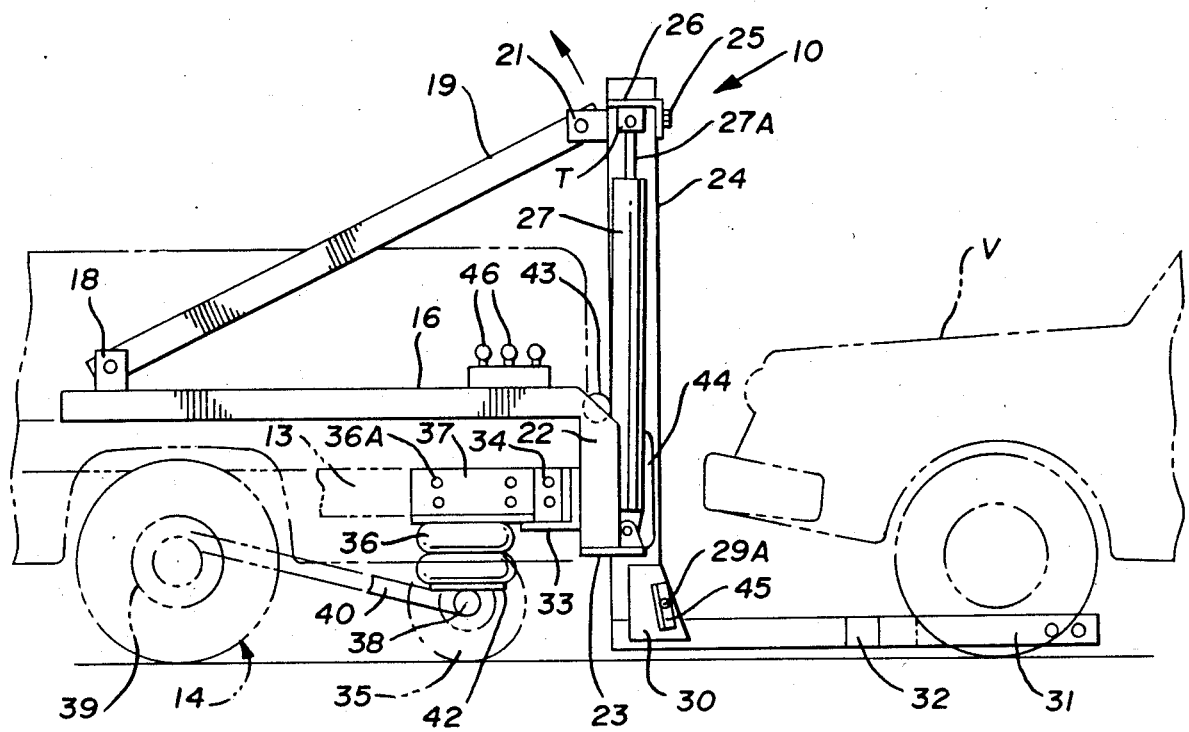
FIG. 1 is a side plan view of an auto wheel lift device.
Figure 2:
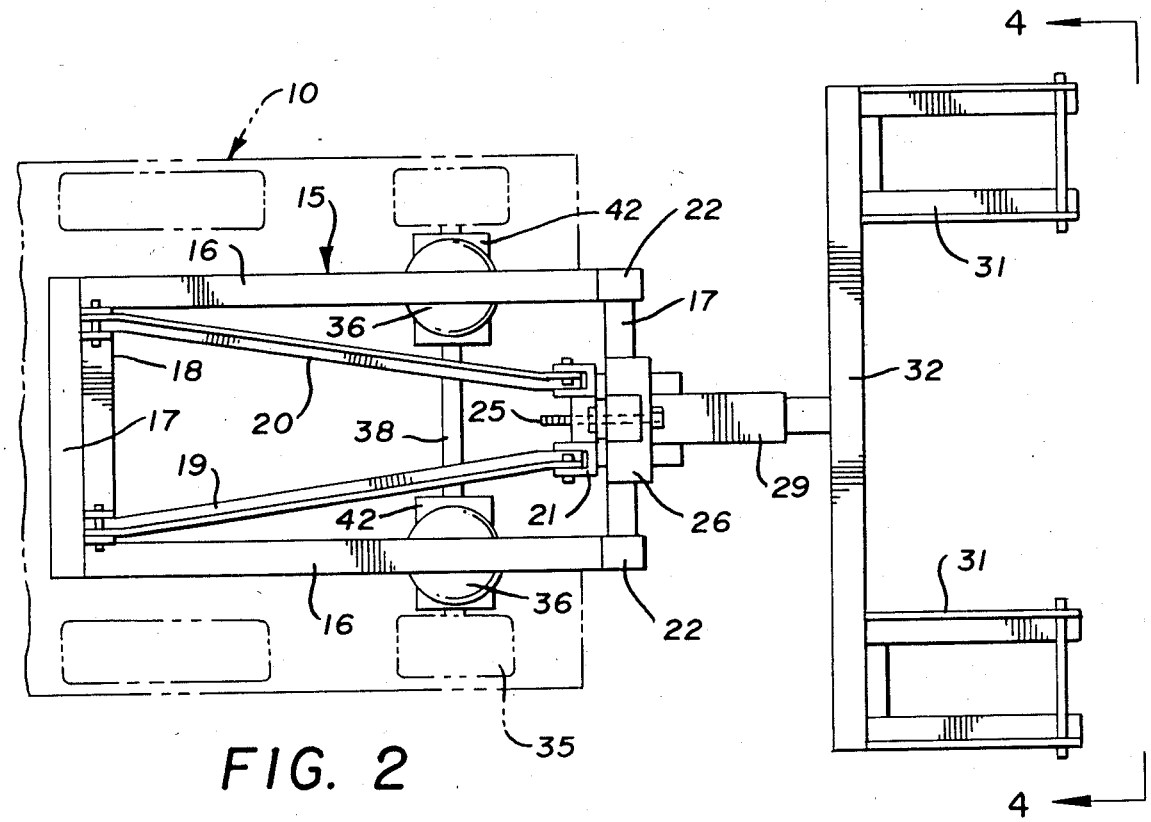
FIG. 2 is a top plan view of the auto wheel lift device.
Figure 3:
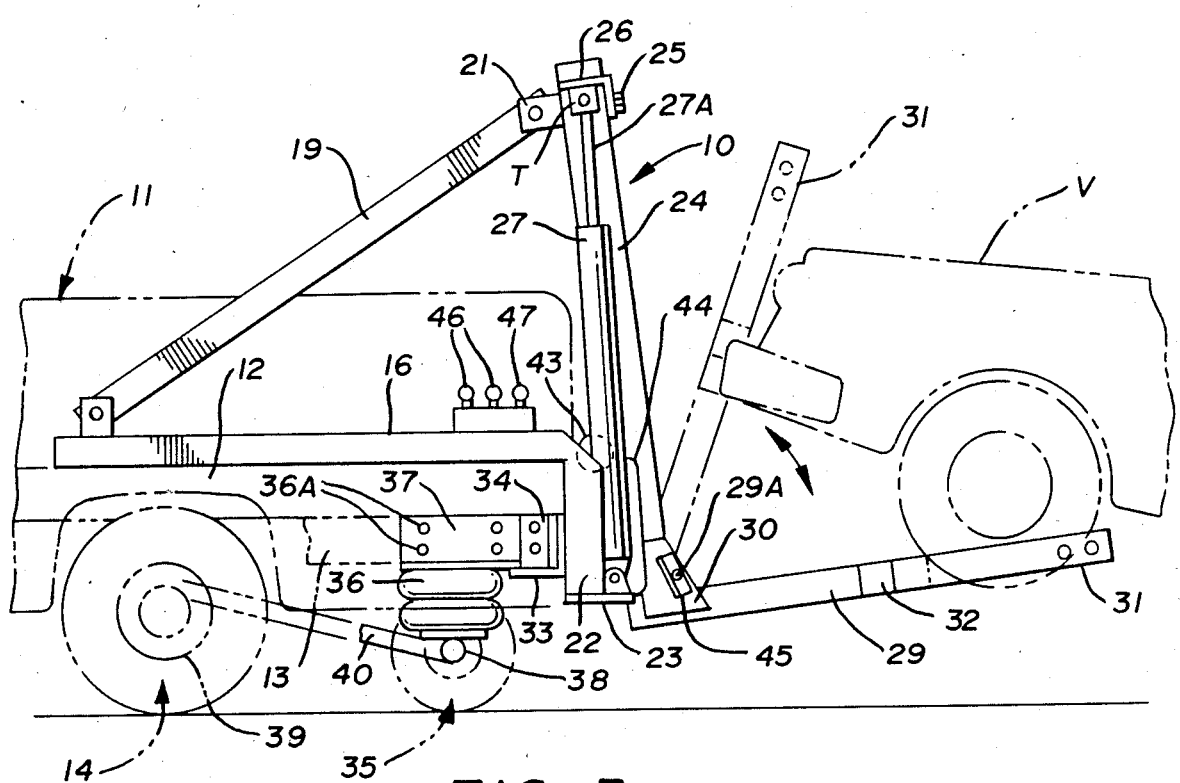
FIG. 3 is a side plan view of the auto wheel lift device in raised position.

An automobile wheel lift device 10 can be seen in Figures 1, 2, and 3 of the drawings positioned within a truck 11 having a truck bed 12, a truck frame 13, and a rear axle and wheel assembly 14. The automobile wheel lift device 10 comprises a generally rectangular support frame 15 having spaced parallel side rails 16 with inner-connected oppositely disposed end rails 17. A boom support member 18 is secured to the support frame 15 and has a pair of spaced angularly disposed boom members 19 and 20 extending therefrom the free ends of which are pivotally secured to an adjustable alignment bracket 21. A pair of vertically aligned spaced extension support frame members 22 from the respective ends of said parallel side rails 16 and are inner-connected by a lift support plate 23. A lift tube 24 is movably secured to the boom alignment bracket 21 by a threaded adjustable inner-connect 25.

A lift bracket 26 is secured to and extends from the upper end of the lift tube 24 and has pairs of oppositely disposed apertured tube T extending therefrom. A pair of spaced hydraulic piston and cylinder assemblies 27 and 28 are pivotally mounted to the lift support frame 23 on opposite sides of the lift tube 24 best seen in FIGS. 1 and 4 of the drawings, piston rods 27A and 28A are connected to the tabs T. The lower end of the lift tube 24 has a telescopically extensible automobile engagement element 29 pivotally secured thereto via a pin 29A extending through said lift tube 24 and support plates 30. A pair of horizontally spaced auto tire engagement frames 31 are positioned on either end of a tubular support arm 32 which is centrally secured to the automobile engagement element 29 as seen in FIG. 2 of the drawings. An L-shaped support beam member 33 is welded to and extends between said support beam members 22 below the truck frame 13 adjacent the lift plate and has spaced apertured angled mounts 34 removably secured thereto so as to provide apertured mounting surfaces abutting a portion of the trucks frame 13. A supplemental wheel and axle assembly 35 is comprised of a pair of spaced air springs 36 affixed to a spring mount support angle 37 mounted to and abutting the trucks frame 13 by fasteners 36A. A supplemental axle 38 is secured to the trucks rear axle 39 via a pair of trailing arms 40 and associated clamps 41 and to the air springs 36 by spring mount plates 42 as will be known to those skilled in the art.

Figure 4:
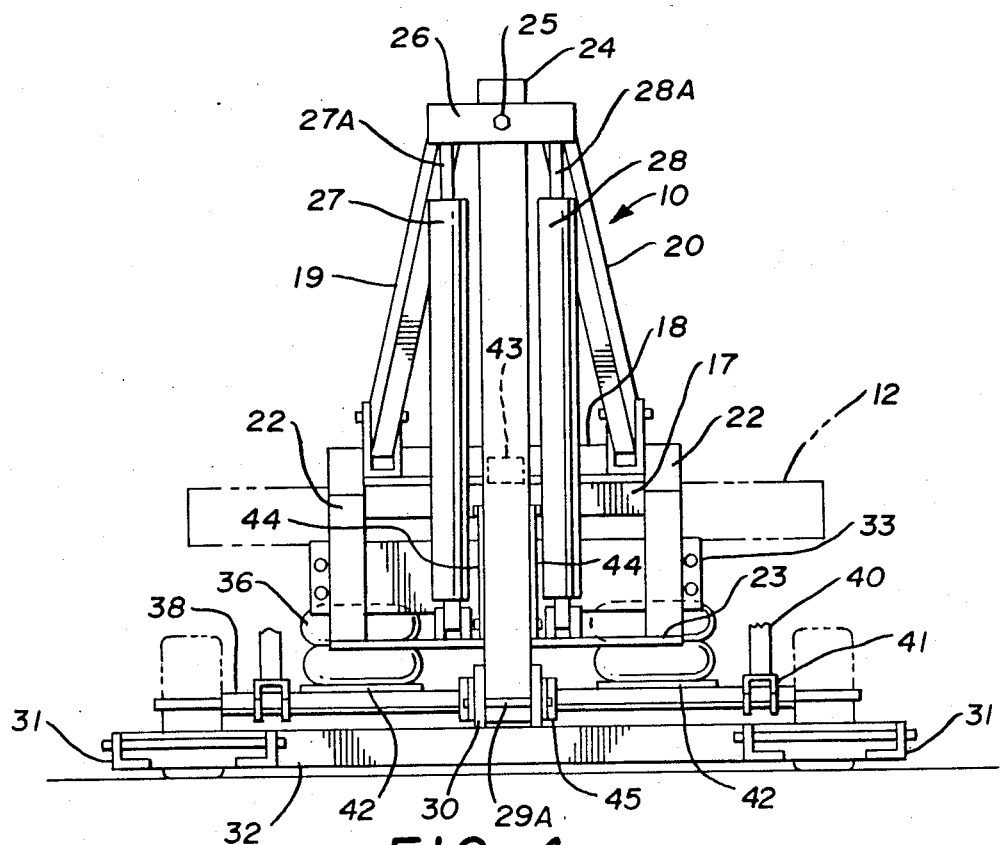
FIG. 4 is an end plan view of the auto wheel lift device on lines 4—4 of FIG. 2.

Referring now to FIG. 4 of the drawings a roller 43 is shown in broken lines mounted to the end rail 17 between the support frame members 22 and is aligned to engage the lift tube 24. A pair of lift tube guides 44 are positioned between the lift frame 23 to the end rail 17 on either side of the lift tube 24 and are aligned to selectively engage retraction levers 45 mounted on the pivot pin 29A.

In operation the piston and cylinders assemblies 27 and 28 are inner-connected to a fluid pressure supply source via supply lines (not shown for clarity) and control valve 46 mounted on the rail 16. The air springs 36 are connected to an air pressure source via supply lines (not shown for clarity) with a selective control valve 47 and are activated when a vehicle V shown in broken lines is to be towed.

Referring to FIG. 1 of the drawings the lift tube 24 has been lowered by the piston and cylinder assemblies 27 and 28 and the support arm 32 with its tire engagement frames 31 are on the ground G. The vehicle V is positioned on the frames 31 and the piston and cylinder assemblies 27 and 28 are activated raising the lift tube 24 against the roller 43 vertically and slightly angularly due to the arcuate travel of the top of the lift tube 24 imposed by the boom members 19 and 20 that are of fixed lengths and have fixed pivot points. As the lift tube 24 ascends it tips inwardly slightly raising the vehicle V higher than the relative lift height of tube 24 due to the angular inclination of the tube 24 and connected auto engagement element 29 and associated tire engagement frames 31 as seen in FIG. 3 of the drawings.

The threaded adjustment inner-connect 25 can increase the distance between the lift bracket 26 and the alignment bracket 21 thereby allowing the lift tube 24 when in down position and connected tire engagement frames 31 to tip downwardly away from the bottom members 19 and 20 lowering same to compensate for vehicles on even ground to be towed.

The retraction levers 45 can be moved into position for selective engagement by the tube guides 44 which will pivot the auto engagement element inwardly and upwardly towards the lift tube 24 as same is raised, see broken lines in FIG. 3 of the drawings.

Thus it will be seen that a new and useful automobile wheel lift device has been illustrated and described and it will be apparent to those skilled in the art that various changes and modifications may be made therein without departing from the spirit of the invention. Therefore,

I claim:

1. An automobile wheel lift device used to convert a pick-up truck have a rear axle assembly into a tow truck, comprises a horizontally extending support frame secured to a truck frame on said pick-up truck, said support frame is comprised of elongated side and end rails in a generally rectangular arrangement having extension support frame members extending in a vertical direction at right angles thereto, boom members pivotally secured to a portion of said support frame, a lift tube movably positioned on said extension support frame member of said support frame rearwardly of said rear axle assembly, said lift tube pivotally secured on one of its ends to said boom members, an automobile engagement element pivotally secured to the other end of said lift tube, means on said automobile engagement element for securing an automobile thereon, means for securing said support frame to said truck frame rearwardly of said rear axle and wheel assembly, hydraulic piston and cylinder assemblies pivotally secured to a portion of said support frame between said extension of said support frame members extending at right angles therefrom rearwardly of said rear axle and wheel assembly, and to said lift tube at said one of its ends, for lifting said lift tube from a first vertically aligned position at rest to a second position angularly disposed from said vertical, and said auto engagement element in relation to said support frame, a supplemental wheel and axle assembly mounted between said axle and said extension support frame members and pivotally secured to said truck, and lift tube guide means on said support frame.

2. The automobile lift device of claim 1 wherein said means on said automobile engagement element for securing an automobile thereon comprises a pair of oppositely disposed tire engagement frames.

3. The automobile wheel lift device of claim 1 wherein said means for securing a portion of said support frame to said truck frame comprises an L-shaped support beam member secured to said portion of said support frame having spaced apertured angled mounted secured thereto abutting a portion of said truck frame.

* * * * *